United States Patent
Inamura

(10) Patent No.: US 7,862,916 B2
(45) Date of Patent: Jan. 4, 2011

(54) PERPENDICULAR MAGNETIC RECORDING MEDIUM AND MAGNETIC STORAGE DEVICE

(75) Inventor: Ryosaku Inamura, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 85 days.

(21) Appl. No.: 12/362,677

(22) Filed: Jan. 30, 2009

(65) Prior Publication Data

US 2009/0197122 A1    Aug. 6, 2009

(30) Foreign Application Priority Data

Feb. 1, 2008    (JP) ............................. 2008-023113

(51) Int. Cl.
*G11B 5/66* (2006.01)
(52) U.S. Cl. .................................... 428/831.2
(58) Field of Classification Search .................. None
See application file for complete search history.

(56) References Cited

U.S. PATENT DOCUMENTS

| 7,175,925 | B2 * | 2/2007 | Chen et al. ................... 428/831 |
| 2005/0255337 | A1 | 11/2005 | Mukai |
| 2007/0026261 | A1 * | 2/2007 | Marinero et al. .......... 428/831.2 |
| 2007/0224453 | A1 | 9/2007 | Inamura et al. |
| 2008/0131734 | A1 * | 6/2008 | Tang et al. ................... 428/829 |

FOREIGN PATENT DOCUMENTS

| JP | 2001-155321 | 6/2001 |
| JP | 2005-353256 | 12/2005 |
| JP | 2007-250120 | 9/2007 |
| JP | 2007-257804 | 10/2007 |

OTHER PUBLICATIONS

Toshio Ando et al., "Triple-Layer Perpendicular Recording Media for High SN Ratio and Signal Stability", IEEE Transactions on Magnetics, vol. 33, No. 5, Sep. 1997, pp. 2983-2985.
S.S.P. Parkin, "Systematic Variation of the Strength and Oscillation Period of Indirect Magnetic Exchange Coupling through the 3d, 4d, and 5d Transition Metals", vol. 67, No. 25, Physical Review Letters, Dec. 16, 1991, pp. 3598-3601.

* cited by examiner

*Primary Examiner*—Holly Rickman
(74) *Attorney, Agent, or Firm*—Staas & Halsey LLP

(57) ABSTRACT

The perpendicular magnetic recording medium includes a non-magnetic underlayer composed of Ru or an Ru alloy having a columnar structure in which crystalline particles are isolated from each other by a space, a non-magnetic granular layer provided on the non-magnetic underlayer and composed of crystalline particles and a non-soluble phase and a granular magnetic layer provided on the non-magnetic granular layer and composed of CoCrPt alloy crystalline particles and the non-soluble phase, wherein when a lattice constant in an in-plane direction of the non-magnetic underlayer is a1, the lattice constant in the in-plane direction of the non-magnetic granular layer is a2, and the lattice constant in the in-plane direction of the granular magnetic layer is a3, the relation a1>a2>a3 is satisfied.

11 Claims, 6 Drawing Sheets

PERPENDICULAR MAGNETIC RECORDING MEDIUM AND MAGNETIC STORAGE DEVICE

CROSS REFERENCES TO RELATED APPLICATIONS

This application is based upon and claims the benefit of priority of the prior Japanese Patent Application No. 2008-23113 filed on Feb. 1, 2008, the entire contents of which are incorporated herein by reference.

FIELD

The present invention relates to a perpendicular magnetic recording medium suitable for high density recording and a magnetic storage device having such a perpendicular magnetic recording medium.

BACKGROUND

With the development of information processing technique, a magnetic disk apparatus used as an external recording apparatus or the like in a computer is required to have a large capacity and a high performance such as fast transfer. In view of such a requirement, in order to achieve high recording density in magnetic recording, in recent years, a perpendicular magnetic recording system suitable for high density recording in principle is put into practical use.

Also in the perpendicular magnetic recording system, as in the case of a horizontal magnetic recording system, to reduce noise in a recording layer (or a magnetic layer) of a magnetic recording medium is effective in increasing recording density. Conventionally, a coercive force of the recording layer is increased, or magnetic particles composing the recording layer is miniaturized and isolated, whereby noise is reduced.

In order to reduce noise, so-called a granular layer composed of magnetic particles in a part of a perpendicular recording layer and a non-magnetic oxide or a non-magnetic nitride is used. When the recording layer is composed of the granular layer, an oxide or a nitride segregates around the magnetic particles, and magnetic separation between the magnetic particles is enhanced. It is relatively effective to provide a structure in which a ruthenium (Ru) underlayer is provided below the recording layer. The Ru underlayer is provided for the purpose of facilitating the magnetic separation between the magnetic particles composing the recording layer. With regard to the Ru underlayer, there is proposed a method for separating an Ru layer, to be provided directly under the recording layer composed of the granular layer, by a space (for example, Japanese Patent Application Laid-Open No. 2005-353256).

However, even if the recording layer is composed of the granular layer or has a structure in which the Ru underlayer is provided below the recording layer, there is a problem that it is difficult to further enhance a signal-to-noise ratio (SNR), a cumulative square error (VMM) as an indicator of an error rate, and rear/write properties of a magnetic recording medium represented by an effective track width WCw or the like. It is considered to be due to insufficiency of magnetic separation between the magnetic particles composing the recording layer.

The effective track width WCw is an effective width of a track. A write width of a magnetic head is measured from a profile of the result that data is written and read while offsetting the magnetic head to a track on a magnetic recording medium, whereby the effective track width is obtained.

SUMMARY

Thus, an object is to provide a perpendicular magnetic recording medium and a magnetic storage device which realize the improvement of crystal orientation of a granular layer and the anisotropic magnetic field and the enhancement of recording reproduction properties.

According to one embodiment, the perpendicular magnetic recording medium includes a non-magnetic underlayer composed of Ru or an Ru alloy having a columnar structure in which crystalline particles are isolated from each other by a space, a non-magnetic granular layer provided on the non-magnetic underlayer and composed of crystalline particles and a non-soluble phase and a granular magnetic layer provided on the non-magnetic granular layer, which is formed of an Ru—Co alloy and an oxide or an Ru—Co alloy and a nitride, and composed of CoCrPt alloy crystalline particles and the non-soluble phase. When a lattice constant in an in-plane direction of the non-magnetic underlayer is a1, the lattice constant in the in-plane direction of the non-magnetic granular layer is a2, and the lattice constant in the in-plane direction of the granular magnetic layer is a3, the relation a1>a2>a3 is satisfied.

DESCRIPTION OF EMBODIMENTS

One embodiment of the invention is hereinafter described with reference to the drawings.

First, a structure of a perpendicular magnetic recording medium as assumption is described. In order to enhance S/N, it is considered that a non-magnetic Co—Cr alloy and a non-magnetic granular intermediate layer which is a non-soluble phase are provided between an Ru underlayer and a granular magnetic layer to thereby improve recording reproduction properties.

Figure 1:
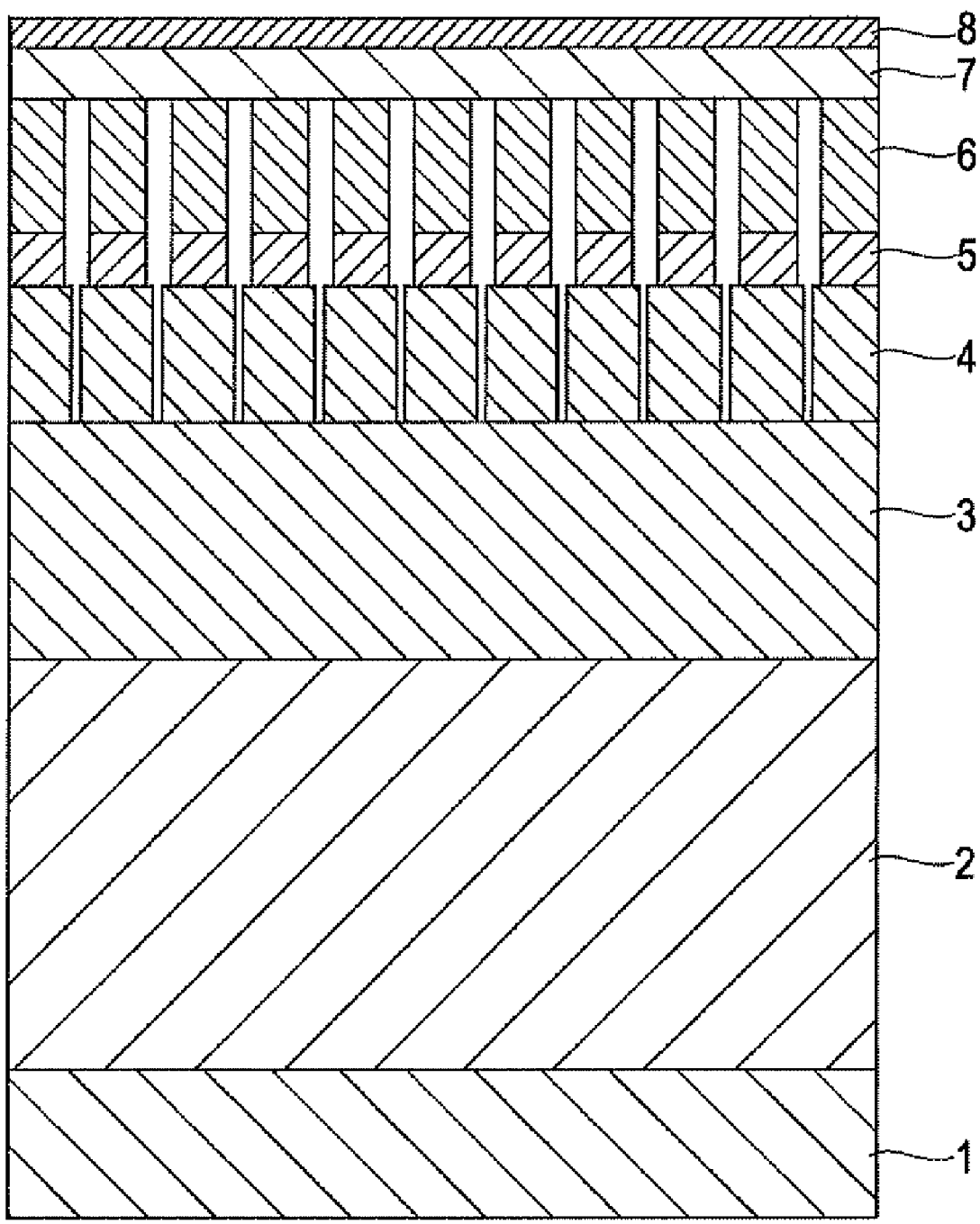
FIG. 1 is a cross-sectional view of a perpendicular magnetic recording medium having a layer structure in which a non-magnetic granular intermediate layer is provided between an Ru underlayer and a granular magnetic layer.

FIG. 1 is a cross-sectional view of a perpendicular magnetic recording medium having a layer structure in which the non-magnetic granular intermediate layer is provided between the Ru underlayer and the granular magnetic layer. In FIG. 1, a soft magnetic backing layer 2, a continuous film underlayer 3, an Ru underlayer 4, a non-magnetic granular layer 5, a granular magnetic layer 6 which is a perpendicular recording layer, and a protective film 7 are sequentially formed on a glass substrate 1 which is a non-magnetic substrate. A lubricant is applied onto the surface of the protective film 7 to form a lubricant layer 8.

The Ru underlayer 4 formed on the continuous film underlayer 3 is formed of a large number of substantially columnar-shaped Ru particles separated by a space. While following the structure of the Ru underlayer 4, metal crystalline particles of the non-magnetic granular layer 5 and the granular magnetic layer 6 grow on the crystalline particles of the Ru underlayer 4, and an oxide or a nitride precipitates on a space of the Ru underlayer and is formed into a substantially columnar-shape.

Here, when a Co—Cr—Pt alloy is used as the granular magnetic layer 6, and when a Co—Cr alloy non-magnetic granular material is used as the non-magnetic granular layer 5, a value of a lattice constant of a close-packed surface of the Ru under layer 4, the non-magnetic granular layer 5, and the granular magnetic layer 6 satisfies the relation: the Ru under layer 4>the granular magnetic layer 6>the non-magnetic granular layer 5. Specifically, the lattice constant of the close-packed surface of Ru composing the Ru underlayer 4 is 2.70 Å, the lattice constant of the close-packed surface of Co60Cr40 composing the non-magnetic granular layer S is 2.51 Å, and the lattice constant of the close-packed surface of Co66Cr13Pt21 composing the granular magnetic layer 6 is 2.56 Å. Thus, the Ru underlayer 4 and the granular magnetic layer 6 with a large lattice constant are bonded through the non-magnetic granular layer 5 with a small lattice constant.

According to the layer structure of the above lattice constant, in view of epitaxial growth, it is found that many defects may occur in the crystal growth of an initial layer of the granular magnetic layer 5 formed of a Co—Cr—Pt alloy. There has been known that a crystal defect in the initial layer increases noise due to, for example, a disturbance of crystal orientation, a degradation of an anisotropic magnetic field, and increasing of distribution. Thus, it is found that if the defects occurring in the crystal growth of the initial layer of the granular magnetic layer 6 are reduced, the disturbance of the crystal orientation is suppressed, whereby noise in the perpendicular magnetic recording medium can be reduced.

Thus, in one embodiment of the invention, the lattice constant of the close-packed surface of the non-magnetic granular layer interposed between the Ru underlayer and the granular magnetic layer is set to an intermediate value between the lattice constant of the close-packed surface of an Ru intermediate layer and the lattice constant of the close-packed surface of a Co—Cr—Pt granular magnetic layer, whereby the crystal orientation and the anisotropic magnetic field are improved, and thus the recording reproduction properties are further enhanced.

Figure 2:
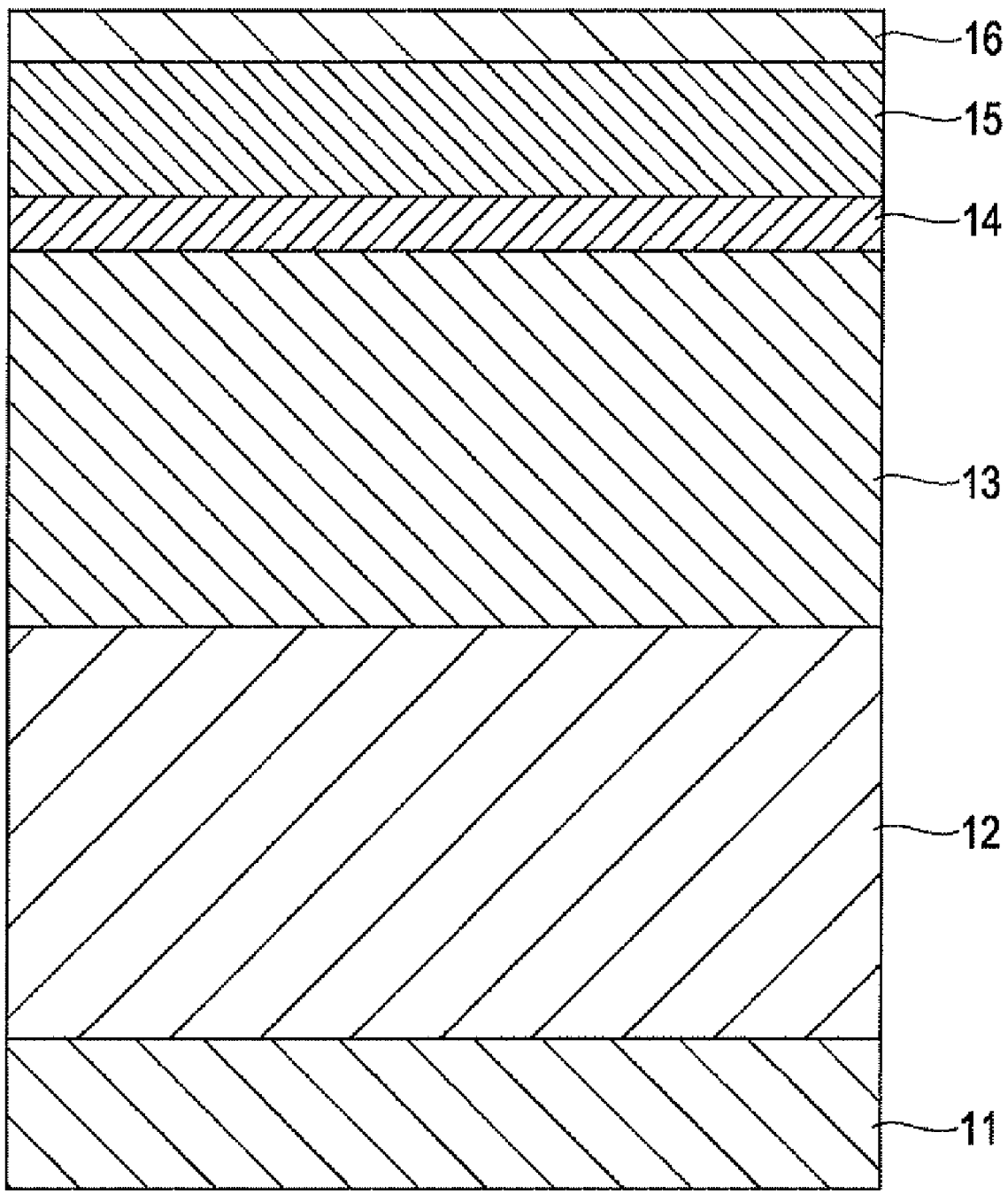
FIG. 2 is a cross-sectional view showing a basic structure of a perpendicular recording layer medium having a perpendicular recording layer according to one embodiment.

The structure of the recording layer of the perpendicular magnetic recording medium according to the present embodiment is described with reference to FIG. 2. FIG. 2 is a cross-sectional view of a basic structure of the perpendicular recording layer medium having the perpendicular recording layer according to the present embodiment.

As shown in FIG. 2, a soft magnetic backing layer 12, a non-magnetic underlayer 3, a non-magnetic granular intermediate layer 14, a perpendicular recording layer 15 which is a magnetic layer, and a protective film 16 are sequentially formed on a glass substrate 11 which is a non-magnetic substrate. In order to enhance adhesiveness of the soft magnetic backing layer 12 and control the anisotropic magnetic field, a seed layer or the like may be provided between the glass substrate 11 and the soft magnetic backing layer 12.

The soft magnetic backing layer 12 may have a stacked structure of two or more layers for the purpose of controlling its own magnetic domain. The soft magnetic backing layer 12 may not be provided; however, in order to obtain a larger recording magnetic field and a larger magnetic gradient, it is preferable that the soft magnetic backing layer 12 is provided.

The non-magnetic underlayer 13 may be an underlayer composed of continuous Ru films, may be an Ru underlayer having the texture of the columnar structure in which at least crystalline particles are isolated from each other by a space, or may have a multilayer stack structure with an Ru alloy non-magnetic underlayer as an uppermost layer.

In order to improve the crystal grain size and the crystal orientation in the perpendicular recording layer 15, a layer having a stacked structure of one or multi layers may be provided between the Ru underlayer, which has the texture of the columnar structure in which the crystalline particles are isolated from each other by a space, or the Ru alloy non-magnetic underlayer 13 and the soft magnetic backing layer 12.

The non-magnetic granular layer 14 is provided on the non-magnetic underlayer 13 having a physical segregation structure on the outermost surface. The perpendicular recording layer 15 includes a granular magnetic layer having the columnar structure in which at least Co—Cr—Pt alloy particles are isolated by a none soluble phase. In order to enhance the recording reproduction properties, two or more granular magnetic layers may be provided in the perpendicular recording layer 15. Further, when the perpendicular recording layer 15 is composed of two or more granular magnetic layers, a nonmagnetic layer or a weak magnetic layer may be provided between the granular magnetic layers. In addition, in order to enhance recording properties and corrosion resistance, a continuous film magnetic layer may be provided on the granular magnetic layer.

The protective film 16 is provided on the perpendicular recording layer 15. A lubricant may be applied onto the surface of the protective film 16.

In the layer structure shown in FIG. 2, the non-magnetic underlayer 13 is formed of Ru, and the perpendicular recording layer 15 is formed of Co66Cr13Pt21. Thus, as with the layer structure shown in FIG. 1, the lattice constant of the non-magnetic underlayer 13 is 2.70 Å; and the lattice constant of the perpendicular recording layer 15 is 2.56 Å.

Here, in the present embodiment, a material is selected so that the lattice constant a2 of the non-magnetic granular layer 14 interposed between the non-magnetic underlayer 13 and the perpendicular recording layer 15 is between the lattice constant a1 of the non-magnetic underlayer 13 and the lattice constant a3 of the perpendicular recording layer 15. Namely, the non-magnetic granular layer 14 is formed using a material in which the lattice constant is larger than 2.56 Å and smaller than 2.70 Å. The present inventor found that an alloy of Ru and Co was suitable for such a material. Specifically, the present inventor found that Ru65Co35 was used as an example of a material composing the non-magnetic granular layer 14, whereby defects occurring in the crystal growth of the initial layer of the perpendicular recording layer 15 could be reduced, and thus the disturbance of the crystal orientation is suppressed, whereby noise in the perpendicular magnetic recording medium could be reduced.

The lattice constant a2 of Ru65Co35 used as the material of the non-magnetic granular layer 14 is 2.63 Å, and is larger than 2.56 Å and smaller than 2.7 Å. Namely, the lattice constant of each layer becomes smaller in the order of the non-magnetic underlayer 13 (a1=2.70 Å), the non-magnetic granular layer 14 (a2=2.63 Å), and the perpendicular recording layer 15 (a3=2.56 Å) (a1>a2>a3). The lattice constant a2=2.63 Å of Ru65Co35 as the material of the non-magnetic granular layer 14 is just an intermediate value between the lattice constant a1=2.70 Å of the non-magnetic underlayer 13 and the lattice constant a3=2.56 Å of the perpendicular recording layer 15.

Figure 3:
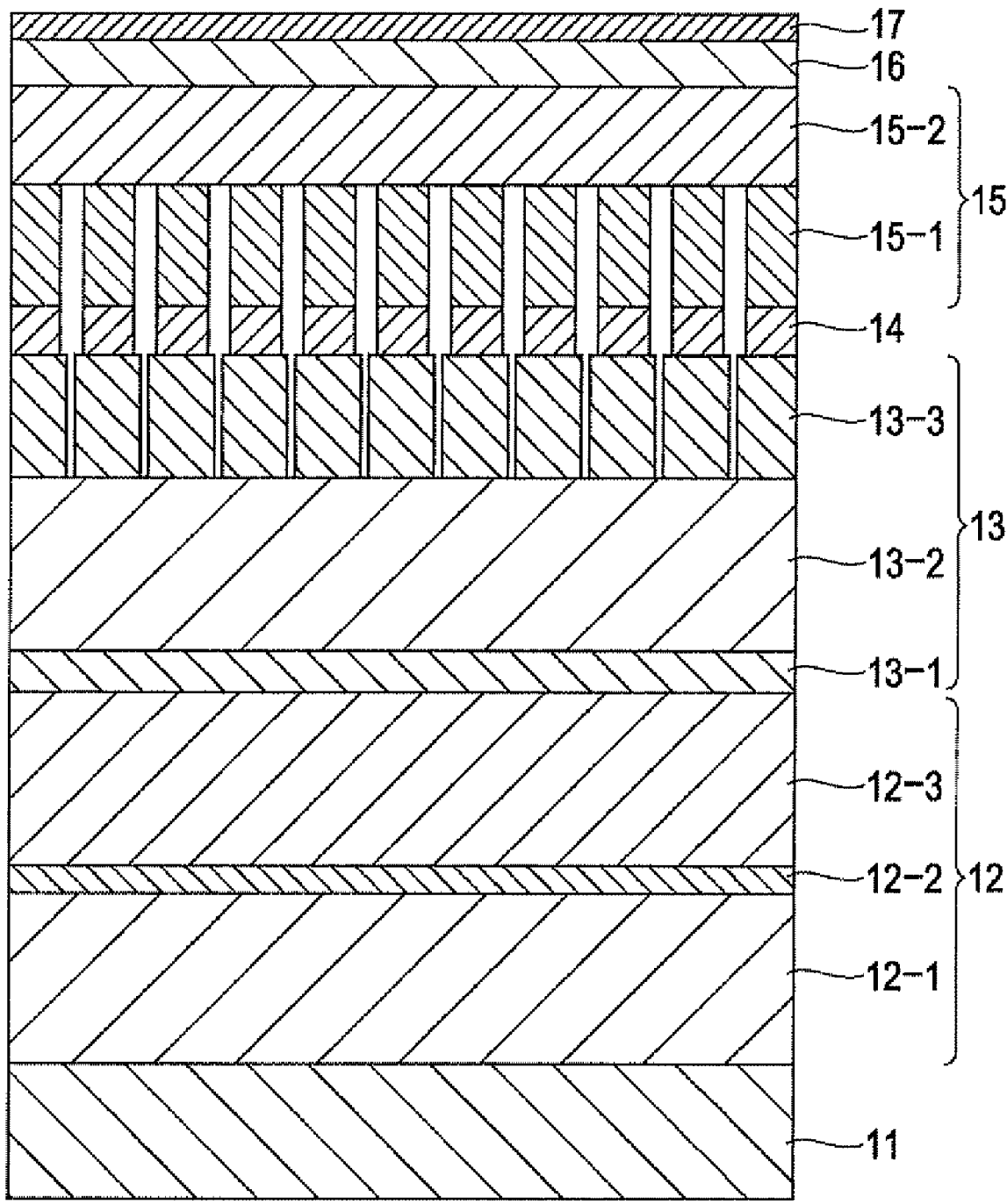
FIG. 3 is a cross-sectional view of the perpendicular magnetic recording medium in which the perpendicular recording layer is formed as the granular magnetic layer.

In the example shown in FIG. 2, the perpendicular recording layer 15 is a continuous layer; however, the perpendicular recording layer 15 is preferably a granular magnetic layer, as with the example shown in FIG. 1. FIG. 3 is a cross-sectional view of the perpendicular magnetic recording medium in which the perpendicular recording layer 15 is formed as the granular magnetic layer.

In FIG. 3, the soft magnetic backing layer 12 is formed on the glass substrate 11 which is a non-magnetic substrate. An Al alloy substrate and a chemical strengthened glass applied with NiP plating, a crystallized glass, a thermally oxidized Si substrate, a plastic substrate, or the like, which are used for a normal magnetic recording medium can be used as the non-magnetic glass substrate 11.

The soft magnetic backing layer 12 in that example is preferably controlled in the magnetic domain for the purpose of suppressing leakage magnetic flux from the backing layer. As domain control techniques, for example, there are proposed a method of aligning the magnetization direction of a backing layer shown in 1) IEEETrans. Magn. Mag—Vol. 33 (September, 1997) pp 2983-2985 and Journal of Magnetics Society of Japan Vol. 23S2 (1999) 63 and a method of antiferromagnetically bonding a soft magnetic backing layer decoupled by an ultra-thin non-magnetic decoupling layer shown in 2) Japanese Patent Laid-Open Publications No. 2001-155321. In the present embodiment, in a similar manner to the method shown in 2), a multilayer structure in which a soft magnetic layer 12-1, a non-magnetic decoupling layer 12-2, and a soft magnetic layer 12-3 are sequentially formed from the glass substrate 11 side, as shown in FIG. 3 is used.

The soft magnetic layer 12-1 is formed of FeCoTaZr; however, in addition to FeCoTaZr, a soft magnetic material in an amorphous structure region or a microcrystalline structure region, such as CoZrNb, CoNbTa, FeCoZrNb, FeCoB, FeCoCrB, NiFeSiB, FeAlSi, FeTaC, FeHfC, or NiFe may be used. In order to reduce noise from a backing layer, the soft magnetic material preferably has an amorphous structure or a microcrystalline structure.

The non-magnetic decoupling layer 12-2 is a layer formed of Ru. It is preferable that the film thickness of the non-magnetic decoupling layer 12-2 is selected so that magnetization of the adjacent magnetic layer is antiferromagnetically bonded. When the non-magnetic decoupling layer 12-2 Ru is used, the film thickness of about 0.5 to 1 nm is generally suitable. The material of the non-magnetic decoupling layer 12-2 is not limited to Ru, but, for example, a material shown in S. S. P. Parkin, Physical Review Letters, Vol. 67, No. 25, 16 Dec. 1991, p.p. 3598-3601 can be used.

The soft magnetic layer 12-3 is formed of FeCoNbZr.

When Bs of the soft magnetic backing layer 12 is not less than 1T, the total film thickness of the soft magnetic backing layer 12 is preferably not less than 10 nm from the viewpoint of the recording reproduction properties, particularly not less than 30 nm. Further, from the viewpoint of a mass production facility and cost, the total film thickness of the soft magnetic backing layer 12 is preferably not more than 100 nm, particularly not more than 60 nm.

The non-magnetic underlayer 13 is formed on the soft magnetic backing layer 12. The structure of the non-magnetic underlayer 13 capable of obtaining favorable recording reproduction properties is disclosed in, for example, Japanese Patent Laid-Open Publication Nos. 2005-353256 and 2007-250120. In the example shown in FIG. 3, in order to accelerate the isolation of the magnetic crystal of the granular magnetic layer and improve the grain size of grain crystal and the crystal orientation, the non-magnetic underlayer 13 has a three layer structure with non-magnetic underlayers 13-1, 13-2, and 13-3.

The non-magnetic underlayer 13-1 is a seed layer formed of NiW. The non-magnetic underlayer 13-2 is formed of Ru, and is an Ru layer with accumulated Ru at a high film formation rate under a relatively low pressure atmosphere. The non-magnetic underlayer 13-3 is formed of Ru, and is an Ru layer formed with accumulated Ru at a low film formation rate under a relatively high pressure atmosphere. The non-magnetic underlayer 13-3 has a structure in which Ru crystal grains are physically isolated by a space.

The structure of the non-magnetic underlayer 13-3 is not limited to the above three layer structure, but at least a layer like the non-magnetic underlayer 13-3 having the structure in which the crystalline particles are physically isolated by a space may be exposed from the outermost surface.

The non-magnetic granular layer 14 formed on the non-magnetic under layer 13 is formed of 92 (Ru65Co35)-8SiO2. The system of Ru and Co is a complete solid solution, and the lattice constant can be continuously changed by adjusting a composition ratio of an Ru—Co alloy. The composition of the metal particle part of the non-magnetic granular layer 14 is set to Ru : 65 at. % - Co : 35 at. % to thereby set the lattice constant of the crystalline particles of the non-magnetic granular layer 14 between Ru and a CoCrPt granular magnetic layer to be described later. The non-magnetic granular layer is not limited to the above composition, but may contain at least one or more kinds of oxide or nitride of Si, Ti, Cr, Co, Ta, Zr, and Hf, for example $Cr_2O_3$ may be used instead of $SiO_2$. The crystalline particles of the non-magnetic granular layer may contain at least any kind of Ru, Re, Rh, and Ir and at least any kind of Co, Cr, V, Fe, Mn and Ni in a range where an hcp structure or an fcc structure is maintained.

The perpendicular recording layer 15 is formed on the non-magnetic granular layer 14. The perpendicular recording layer 15 is composed of a granular magnetic layer 15-1 and a write assist layer 15-2. Namely, in order to give favorable recording reproduction properties to the perpendicular recording layer 15, the granular magnetic layer 15-1 is a perpendicular magnetic film with a granular layer structure provided on a substrate side as disclosed in Japanese Patent Laid-Open Publication No. 2007-0257804. The write assist layer 15-2 formed on the granular magnetic layer 15-1 is a perpendicular magnetic film with so-called a continuous film structure.

The protective film 16 formed of carbon is formed on the perpendicular recording layer 15, and a lubricant is applied onto the protective film 16 to form the lubricant layer 17.

In the present embodiment, as described above, the non-magnetic granular layer 14 formed on the non-magnetic underlayer 13-3 is formed of 92 (Ru65-Co35)-8SiO2, whereby the lattice constant $a_2$ of the non-magnetic granular layer 14 is 2.63 Å. Since the non-magnetic underlayer 13-3 is formed of Ru, the lattice constant $a_1$ 2.70 Å. Since the granular magnetic layer 15-1 formed on the non-magnetic granular layer 14 is formed of CoCrPt, the lattice constant $a_3$=2.56 Å. Thus, the lattice constant of each layer becomes smaller in the order of the non-magnetic underlayer 13-3 ($a_1$=2.70 Å), the non-magnetic granular layer 14 ($a_2$=2.63 Å), and the granular magnetic layer 15-1 ($a_3$=2.56 Å) ($a_1>a_2>a_3$). The lattice constant $a_2$=2.63 Å of Ru65Co35 composing the non-magnetic granular layer 14 is just an intermediate value between the lattice constant $a_1$=2.70 Å of the non-magnetic underlayer 13-3 and the lattice constant $a_3$=2.56 Å of the granular magnetic layer 15-1.

As described above, the lattice constant is set so as to become smaller in the order of the non-magnetic underlayer 13-3 (a1=2.70 Å), the non-magnetic granular layer (a2=2.63 Å), and the granular magnetic layer 15-1 (a3=2.56 Å) (a1>a2>a3), whereby defects occurring in the crystal growth of the initial layer of the perpendicular recording layer 15 can be reduced, and thus the disturbance of the crystal orientation is suppressed, whereby noise in the perpendicular magnetic recording medium can be reduced.

Next, a perpendicular magnetic recording medium with a layer structure in which the relation of the lattice constants a1, a2, and a3 satisfies the inequality a1>a2>a3 as above is produced, and the result of evaluating the magnetic properties and the recording reproduction properties is hereinafter described.

Example 1

First, as an Example 1, a sample of a perpendicular magnetic recording medium with the layer structure shown in FIG. 3 is created.

25 nm of FeCoTaZr as the underlayer soft magnetic layer 12-1 is deposited on the glass substrate 11 at an input electric power of 1 kW in an Ar atmosphere at pressure of 0.5 Pa by using a DC sputtering method. Although each layer to be hereinafter described is deposited by using the DC sputtering method unless otherwise noted, other methods including an RF sputtering method, a pulse DC sputtering method, and an CVD method may be used.

Next, 0.4 nm of Ru as the non-magnetic decoupling layer 12-2 is deposited on the FeCoTaZr soft magnetic layer 12-1 at the input electric power of 150 W in the Ar atmosphere at pressure of 0.5 Pa. The film thickness of the Ru non-magnetic decoupling layer 12-2 is set so that magnetization of the adjacent magnetic layer is antiferromagnetically bonded.

Next, 25 nm of FeCoNbZr as the soft magnetic layer 12-3 is deposited on the Ru non-magnetic decoupling layer 12-2 at the input electric power of 1 kW in the Ar atmosphere at pressure of 0.5 Pa by using the DC sputtering method.

Subsequently, 8 nm of NiW is deposited on the non-magnetic underlayer 13-1 at the input electric power of 200 W in the Ar atmosphere at pressure of 0.67 Pa.

Next, 14 nm of Ru as the non-magnetic underlayer 13-2 is deposited at the input electric power of 800 W in the Ar atmosphere at pressure of 0.67 Pa.

Next, 7 nm of Ru as the non-magnetic underlayer 13-3 is deposited at the input electric power of 300 W in the Ar atmosphere at pressure of 5 Pa. As above described, the lattice constant of Ru is 2.70 Å, and the lattice constant of the non-magnetic underlayer 13-3 is 2.70 Å.

Next, 2 nm of 94 (Ru65Co35)-6SiO2 as the non-magnetic granular layer 14 is deposited on the non-magnetic underlayer 13-3 in the Ar atmosphere at pressure of 3 Pa. As described above, the lattice constant of (Ru65Co35) is 2.63 Å, and the lattice constant of the non-magnetic granular layer 14 is 2.63 Å.

Next, the perpendicular recording layer 15 is deposited on the non-magnetic granular layer 14. First, 8 nm of 92 (Co66Cr13Pt21)-8TiO2 as the granular magnetic layer 15-1 provided on the substrate side is deposited at the input electric power of 300 W in the Ar atmosphere at pressure of 4 Pa. The lattice constant of (Co66Cr13Pt21) is 2.56 Å, and the lattice constant of the granular magnetic layer 15-1 is 2.56 Å.

Next, 7 nm of (Co63Cr20Pt13B4) as the continuous film magnetic layer which is the write assist layer 15-2 is deposited at the input electric power of 400 W in the Ar atmosphere at pressure of 0.5 Pa.

Next, 4 nm of the carbon protective film 16 is deposited on the write assist layer 15-2 by the CVD method.

Finally, 1 nm of a lubricant is applied onto the protective film 16 to form the lubricant layer 17, and surface protrusions and foreign substances are removed with a polishing tape.

Example 2

In order to confirm the effect of the improvement of the magnetic properties, a sample in which the write assist layer 15-2 as the continuous film magnetic layer in the Example 1 is not provided and the film thickness of the non-magnetic granular layer 14 (94 (Ru65Co35)-6SiO2) is changed from 0 nm to 5 nm is created as an Example 2.

Figure 4:
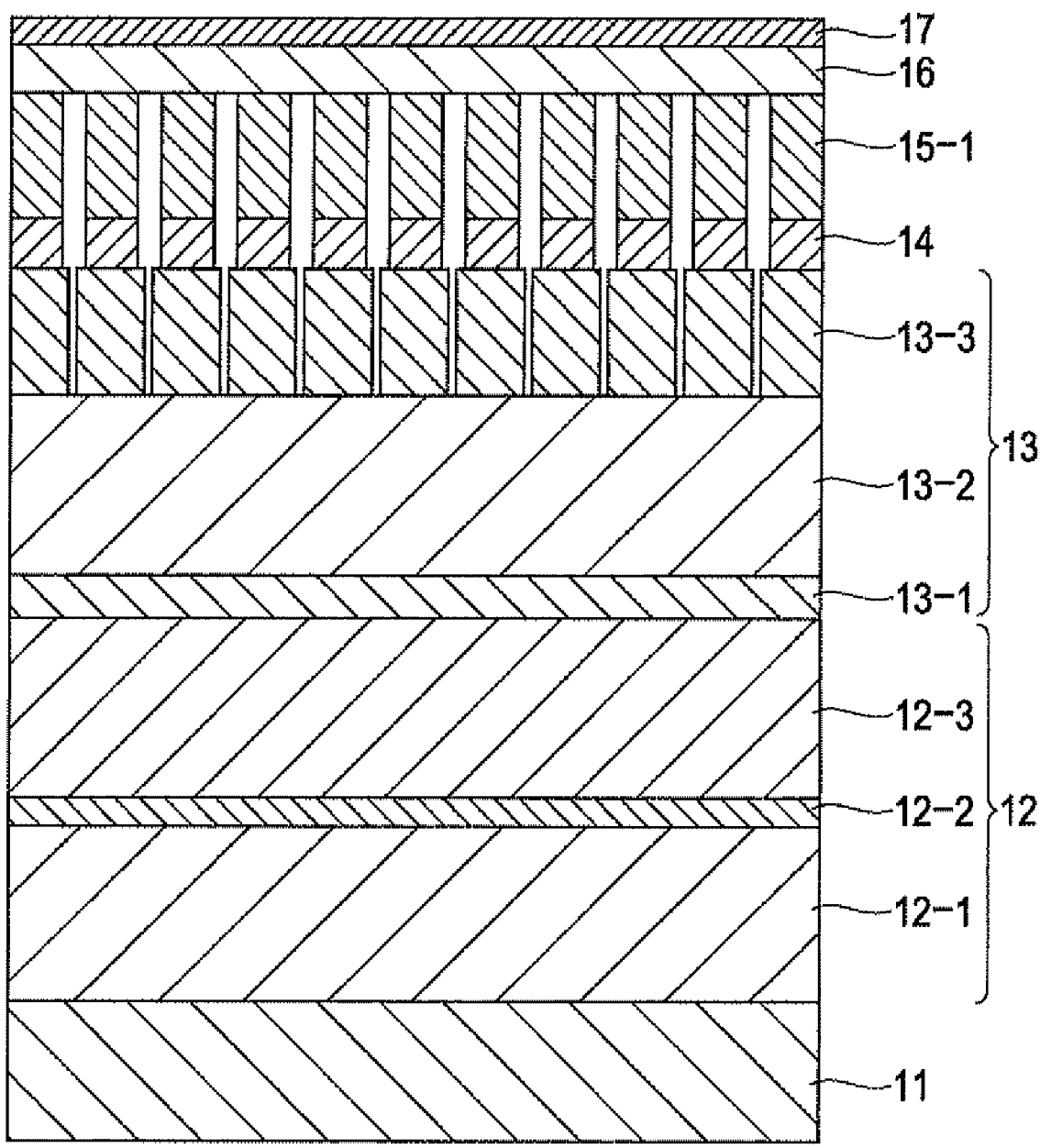
FIG. 4 is a cross-sectional view of the perpendicular magnetic recording medium without a write assist layer.

FIG. 4 is a cross-sectional view of the perpendicular magnetic recording medium without the write assist layer 15-2. The elements from the glass substrate 11 to the granular magnetic layers 15-1 of the perpendicular recording layer 15 have the same constitution as that of FIG. 3. Since the write assist layer 15-2 is not provided, the protective layer 16 is formed on the granular magnetic layer 15-1, and the lubricant layer 17 is formed on the protective layer 16.

In order to create the sample in the Example 2, the layers from the soft magnetic layer 12-1 to the granular magnetic layer 15-1 are formed on the glass substrate 11, under the same conditions and using the same materials as those of the sample in the Example 1, and 4 nm of the carbon protective film 16 is deposited on the granular magnetic layers 15-1 by the CVD method. 1 nm of the lubricant is applied onto the protective film 16 to form the lubricant layer 17, and the surface protrusions and the foreign substances are removed with the polishing tape. As in the case of the Example 1, the lattice constant of the non-magnetic granular layer 14 is 2.63 Å.

Example 3

In the Example 1, each film thickness of the granular magnetic layer 15-1 and the continuous film magnetic layer 15-2 in the perpendicular recording layer 15 is changed under such conditions that a remanence moment of the perpendicular recording layer 15 becomes constant, and a sample with changed magnetic properties is created as an Example 3. As in the case of the Example 1, the lattice constant of the non-magnetic granular layer 14 in the Example 3 is 2.63 Å.

Comparative Example 1

A sample in which the non-magnetic granular layer 14 (94 (Ru65Co35)-6SiO2) in the Example 1 is replaced with the non-magnetic granular layer 14 (94 (Co60Cr40)-6SiO2) is created as a Comparative Example 1. The lattice constant of (Co60Cr40) is 2.51 Å, and thus the lattice constant of the non-magnetic granular layer 14 in the Example 1 is 2.51 Å.

Comparative Example 2

A sample in which the non-magnetic granular layer 14 (94 (Ru65Co35)-6SiO2) in the Example 2 is replaced with the non-magnetic granular layer 14 (94 (Co60Cr40)-6SiO2) is created as a Comparative Example 2. As in the case of the Comparative Example 1, the lattice constant of the non-magnetic granular layer 14 in the Comparative Example 2 is 2.51 Å.

Comparative Example 3

A sample in which the non-magnetic granular layer 14 (94 (Ru65Co35)-6SiO2) in the Example 3 is replaced with the non-magnetic granular layer 14 (94 (Co60Cr40)-6SiO2) is created as a Comparative Example 3. As in the case of the Comparative Example 1, the lattice constant of the non-magnetic granular layer 14 in the Comparative Example 3 is 2.51 Å.

The magnetic properties and the recording reproduction properties are checked by using the Examples 1 to 3 and the Comparative Examples 1 to 3.

First, the magnetic properties in the Example 2 and the Comparative Example 2 are compared with each other. The final recording reproduction properties are greatly influenced by the magnetic properties of the granular magnetic layer 15-2 in the perpendicular recording layer 15, and therefore, the coercive force of the granular magnetic layer 15-2 is measured using a sample without the write assist layer 15-2, that is, using the Example 2 and the Comparative Example 2. When the write assist layer 15-2 is provided, the coercive force of the granular magnetic layer 15-1 under the write assist layer 15-2 cannot be accurately measured, and therefore, the Example 2 and the Comparative Example 2 which are the sample without the write assist layer 15-2 are used.

Figure 5:
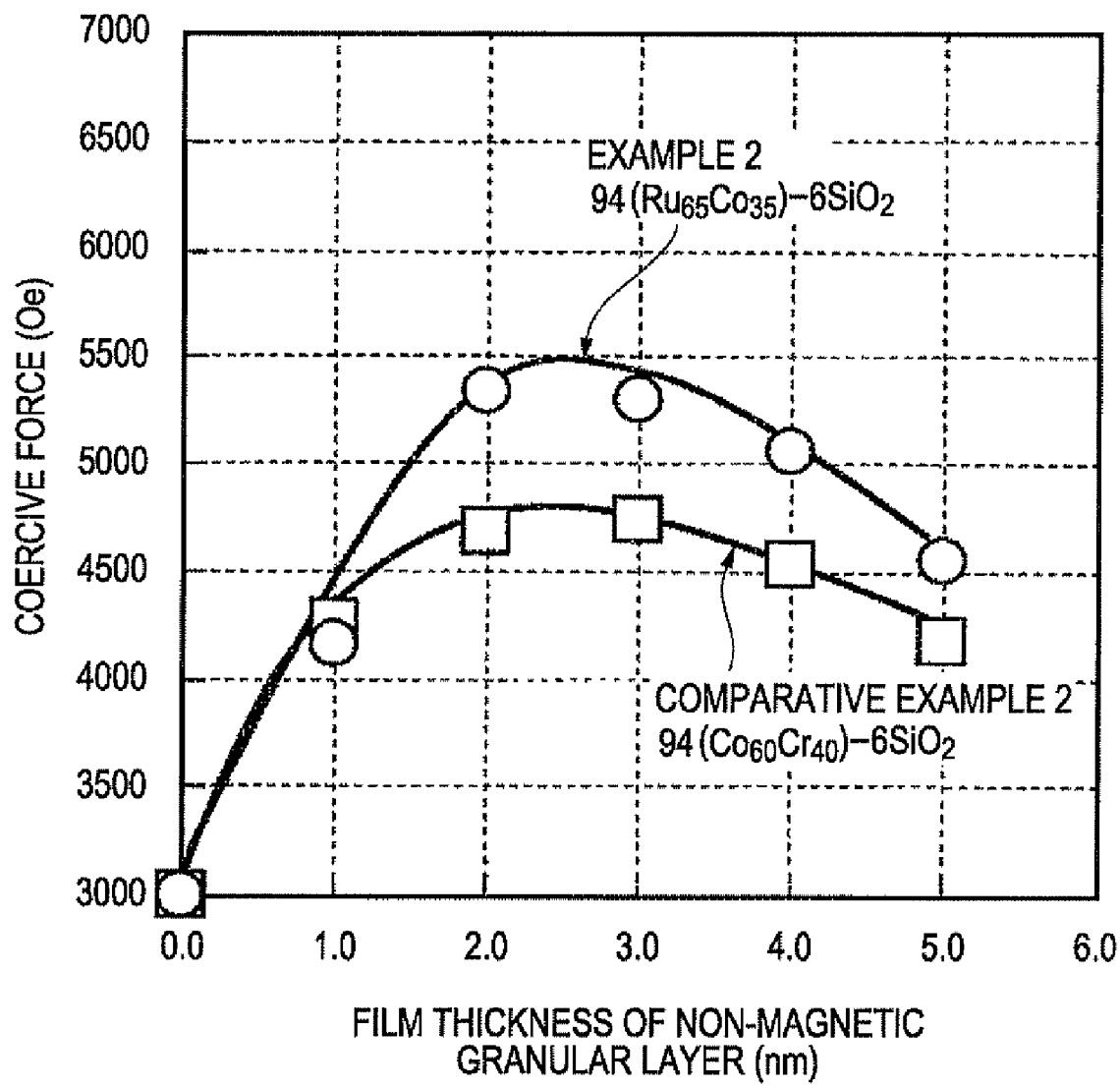
FIG. 5 is a graph in which a film thickness of the non-magnetic granular layer is changed and a coercive force of the granular magnetic layer is plotted.

In a graph shown in FIG. 5, the film thickness of the non-magnetic granular layer 14 is changed, and the coercive force of the granular magnetic layer 15-1 is plotted. Points shown by circles in FIG. 5 represent the coercive force in the Example 2, and points shown by squares represent the coercive force in the Comparative Example 2. It was found that when the film thickness of the non-magnetic granular layer 14 was not less than 1.0 nm, the coercive force in the Example 2 became larger than the coercive force in the Comparative Example 2. The coercive force is preferably large in order to maintain the magnetized state. It is considered that the difference in the coercive force is caused by that while the lattice constant of the non-magnetic granular layer 14 is 2.63 Å in the Example 2, the lattice constant of the non-magnetic granular layer 14 is 2.51 Å in the Comparative Example. Namely, in the Example 2, the lattice constant becomes gradually smaller in the order of the non-magnetic layer 13-3, the non-magnetic granular layer 14, and the granular magnetic layer 15-1, that is, 2.70 Å, 2.63 Å, and 2.56 Å; therefore, the crystal structure of the non-magnetic underlayer 13-3 is preferably inherited by the granular magnetic layer 15-1 in the magnetic recording layer 15 through the non-magnetic granular layer 14. Meanwhile, in the Comparative Example 2, the lattice constant temporarily becomes small in the non-magnetic granular layer 14, that is, 2.70 Å, 2.51 Å, and 2.56 Å and becomes large again in the granular magnetic layer 15-1. It is considered that this is because the crystal structure of the non-magnetic underlayer 13-3 is difficult to be inherited by the granular magnetic layer 15-1.

Figure 6:
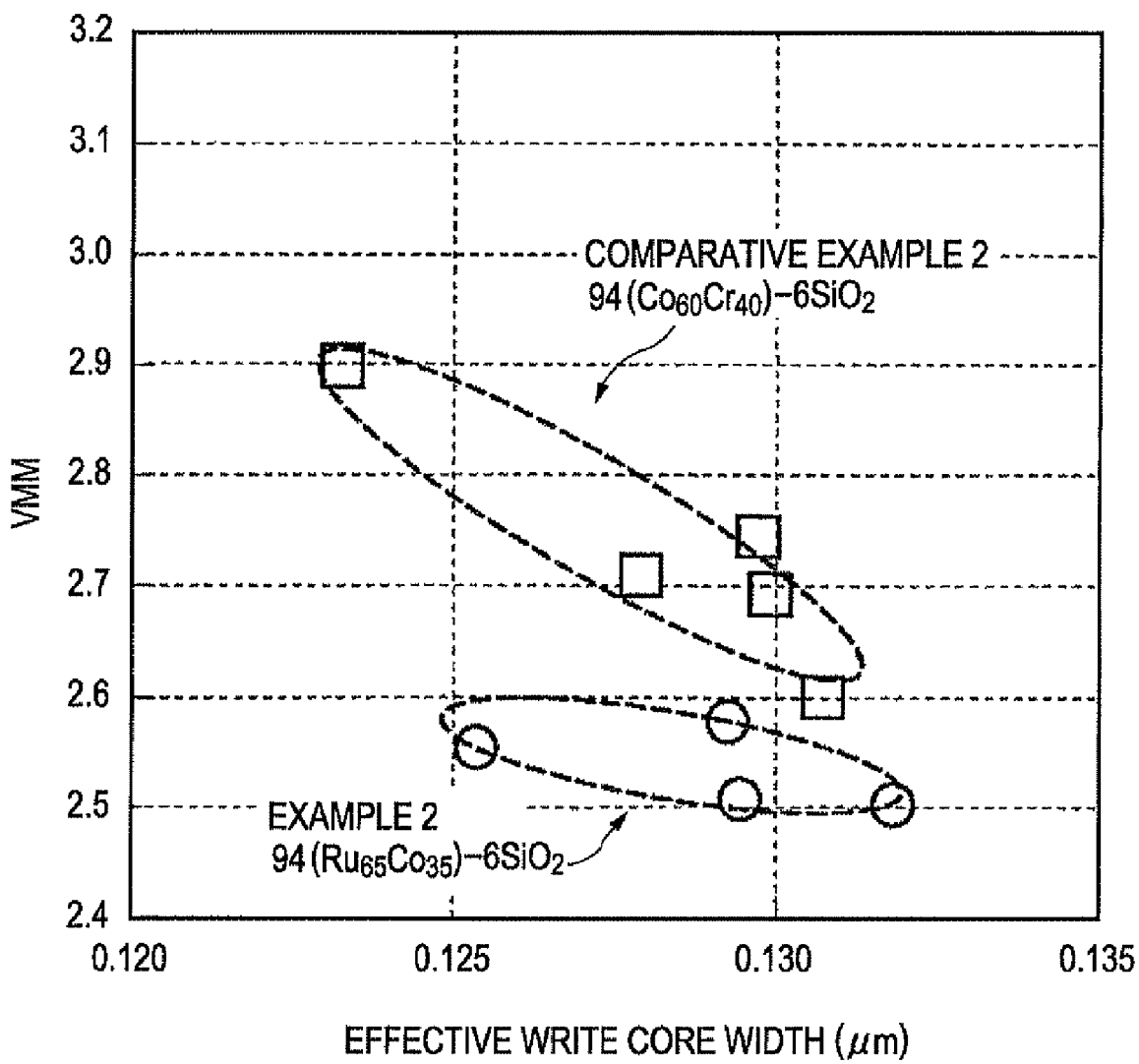
FIG. 6 is a graph in which a value of VMM of the perpendicular magnetic recording medium is plotted.

Next, the recording reproduction properties are compared with each other, using the examples 1 to 3 and the Comparative Examples 1 to 3. In order to determine the recording reproduction properties, the magnetic recording is actually performed in the Examples 1 to 3 and the Comparative Examples 1 to 3, and the cumulative square error (VMM) corresponding to an inverse of the error rate is compared with each other. FIG. 6 is a graph in which a value of VMM is plotted. In this graph, the horizontal axis represents an effective write core width, and the vertical axis represents VMM. As the value of VMM or the effective write core width is smaller, the recording reproduction properties can be determined to be more favorable.

In the graph of FIG. 6, the VMM in the Examples 1 to 3 is represented by circles, and the VMM in the Comparative Examples 1 to 3 is represented by squares. It is found that all the VMMs in the Examples 1 to 3 are smaller than the VMM in the Comparative Examples 1 to 3. Namely, the frequency of recording errors in the magnetic recording using the Examples 1 to 3 is smaller than the frequency of recording errors in the magnetic recording using the Comparative Examples 1 to 3, and it is found that the recording reproduction properties are improved by just that much. As with the above magnetic properties, in the Examples 1 to 3, the lattice constant becomes gradually smaller in the order of the non-magnetic underlayer 13-3, the non-magnetic granular layer 14, and the granular magnetic layer 15-1 that is, 2.70 Å, 2.63 Å, and 2.56 Å. It is considered that the improvement of the recording reproduction properties is because the crystal structure of the non-magnetic underlayer 13-3 is favorably inherited by the granular magnetic layer 15-1 of the magnetic recording layer is through the non-magnetic granular layer 14.

As described above, the perpendicular magnetic recording layer to which the non-magnetic granular layer according to the above embodiment is applied is used, whereby the perpendicular magnetic recording medium with higher recording reproduction properties than the conventional perpendicular magnetic recording medium can be created. Thus, the perpendicular magnetic recording medium with a higher recording density can be provided, and thus a magnetic storage device with a larger recording capacity can be provided.

What is claimed is:

1. A perpendicular magnetic recording medium comprising:
a non-magnetic underlayer composed of Ru or an Ru alloy having a columnar structure in which crystalline particles are isolated from each other by a space;
a non-magnetic granular layer provided on said non-magnetic underlayer and composed of crystalline particles and a non-soluble phase; and
a granular magnetic layer provided on said non-magnetic granular layer and composed of CoCrPt alloy crystalline particles and the non-soluble phase,
wherein when a lattice constant in an in-plane direction of said non-magnetic underlayer is a1, the lattice constant in the in-plane direction of said non-magnetic granular layer is a2, and the lattice constant in the in-plane direction of said granular magnetic layer is a3, the relation a1>a2>a3 is satisfied, and
wherein the non-magnetic granular layer is formed of an Ru—Co alloy and an oxide or an Ru—Co alloy and a nitride.

2. The perpendicular magnetic recording medium according to claim 1, wherein said non-magnetic granular layer contains at least one or more kinds of oxide or nitride of Si, Ti, Cr, Co, Ta, Zr, and Hf.

3. The perpendicular magnetic recording medium according to claim 1, wherein the crystalline particles of said non-magnetic granular layer contain at least any kind of Ru, Re, Rh, and Ir and at least any kind of Co, Cr, V, Fe, Mn, and Ni in a range where an hcp structure or an fcc structure is maintained.

4. The perpendicular magnetic recording medium according to claim 1, wherein said granular magnetic layer is composed of alloy crystalline particles containing at least three elements of Co, Cr, and Pt and a non-soluble phase containing at least one or more kinds of oxide or nitride of Si, Ti, Cr, Co, Ta, Zr, and Hf.

5. The perpendicular magnetic recording medium according to claim 1, further comprising a soft magnetic backing layer provided between said non-magnetic underlayer and a substrate.

6. The perpendicular magnetic recording medium according to claim 1, further comprising a continuous film underlayer with an hcp structure of an fcc structure provided between the non-magnetic underlayer and a substrate.

7. The perpendicular magnetic recording medium according to claim 6, wherein said continuous film underlayer is composed of two or more layers of continuous films with the hcp structure or the fcc structure.

8. The perpendicular magnetic recording medium according to claim 6, further comprising a soft magnetic backing layer provided between said continuous film underlayer and the substrate.

9. The perpendicular magnetic recording medium according to claim 8, wherein said soft magnetic backing layer is mainly composed of Co, Fe, or Ni, and contains at least one or more kinds of Zr, Ta, Nb, B, W, Hf, and C.

10. The perpendicular magnetic recording medium according to claim 1, further comprising a magnetic continuous film provided on said granular magnetic layer and containing at least Co and Cr.

11. A magnetic storage device comprising:

the perpendicular magnetic recording medium according to claim 1 a magnetic head writing and reading information for the perpendicular magnetic recording medium.

* * * * *